July 12, 1927. Re. 16,676

W. W. MUIR

COOLING SYSTEM

Original Filed July 15, 1919 2 Sheets-Sheet 1

Inventor
Wellington W. Muir

By Tal Witherspoon

Attorney

July 12, 1927. Re. 16,676

W. W. MUIR

COOLING SYSTEM

Original Filed July 15, 1919 2 Sheets-Sheet 2

Inventor
Wellington W. Muir
By T. A. Witherspoon
Attorney

Reissued July 12, 1927. Re. 16,676

UNITED STATES PATENT OFFICE.

WELLINGTON W. MUIR, OF LOCKPORT, NEW YORK.

COOLING SYSTEM.

Original No. 1,346,331, dated July 13, 1920, Serial No. 311,009, filed July 15, 1919. Application for reissue filed March 20, 1922. Serial No. 545,374.

This invention relates to a cooling system for internal combustion engines and a method of cooling in which a liquid, which acts as a heat reservoir, a heat vehicle and a temperature equalizing agent, is circulated through the cylinder jackets continuously during the operation of the engine, being introduced into and passed through the radiator only when the predetermined temperature of regulation or critical temperature which would be the temperature of maximum efficiency of the engine is reached, the radiator being drained and inoperative when the engine is not running, and preferably at all times when the temperature of the liquid drops below the critical temperature above mentioned.

Numerous cooling systems in which the circulation of water through the radiator is wholly or partially checked in starting until the system is warmed up to the critical temperature and during running and at all times when it drops below the critical temperature, have been both described in patents and publications and used, but all of these have encountered the important difficulty that in cold weather the radiator is apt to freeze either while the car is standing or when the engine is started, when the fan draft increases the chilling effect on the radiator with no corresponding transfer of heat from the engine to the liquid contents of the radiator. Non-freezing mixtures are of course used but the heavier ones are objectionable on account of destruction of the rubber connections, formation of scale, etc., and the lighter ones are in such systems quickly evaporated at the temperatures maintained in the jacket.

In the present invention freezing and excessive cooling are avoided by automatically withdrawing the cooling liquid from the radiator or both the radiator and jacket to a reservoir in which it is less exposed and in which it may be protected by insulation. Whenever cooling by means of the radiator becomes necessary, the cooling liquid is automatically drawn from the tank in a quantity sufficient for the purpose and passed through the radiator and jacket, circulation through the jacket alone, being maintained whenever the engine is running. Evaporation is prevented by continually mixing the heated liquid and vapors with a cooler body of liquid maintained for this purpose, the invention including among other features an arrangement of connections and a particular type of pump by which this mixing and circulation are accomplished.

In the accompanying drawings, I have illustrated diagrammatically several different cooling systems embodying my invention in slightly different arrangement.

Figures 3, 4:
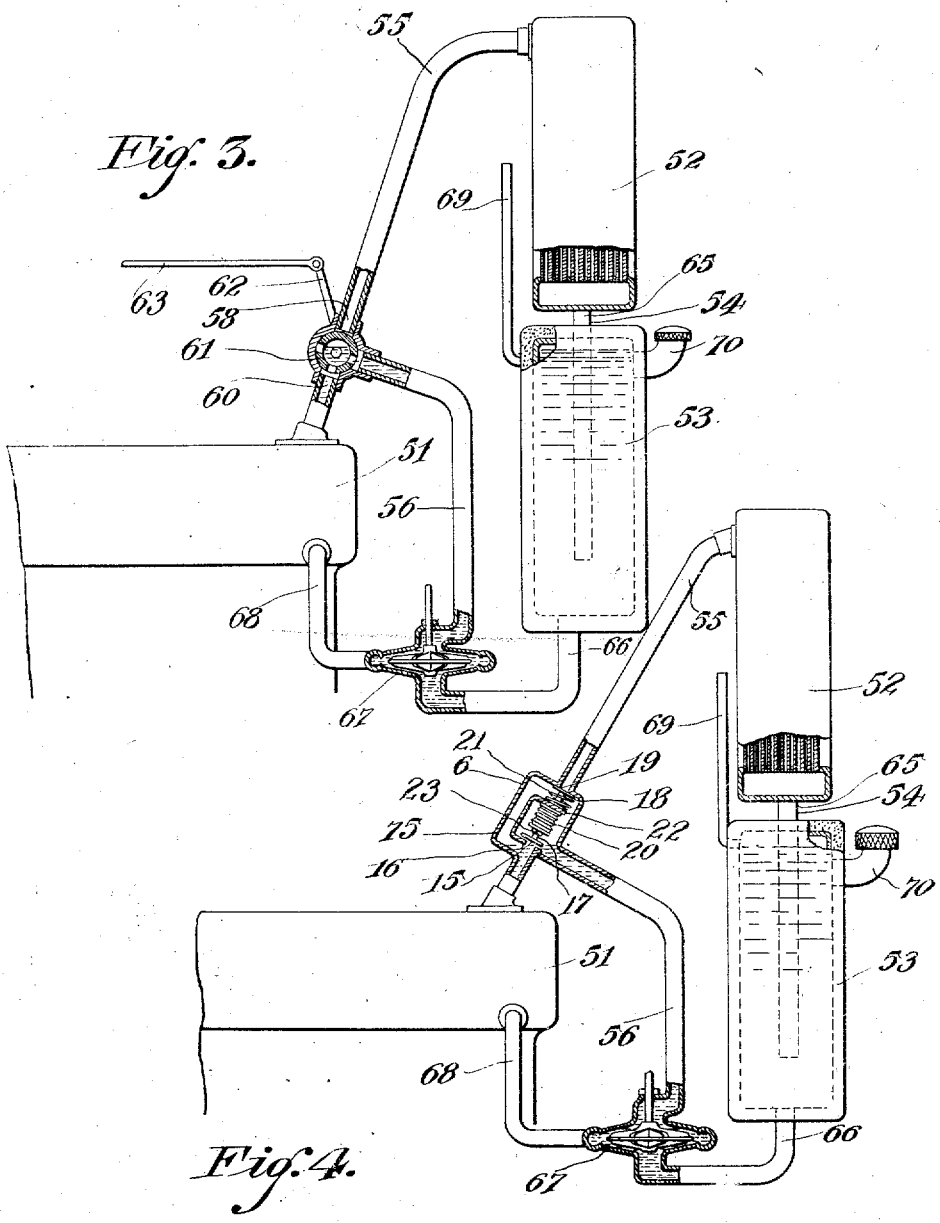

In Figure 3 I have shown still another form including the by-pass, the radiator being above the rest of the system, the circulation being manually controlled;

Figure 4 is a similar view of the same system taken on the same plane but with an automatic instead of a manual control.

Referring to the drawings by numerals, the cooling system disclosed in Figure 1 includes a water jacket 1, radiator 2, a reservoir or tank 3 below the level of the radiator and jacket and having a fluid capacity preferably equal to or exceeding that of the jacket and radiator taken together. In this instance as shown the radiator occupies the usual position relatively to the water jacket and has connections 4, 5 between the jacket and the radiator corresponding to those in the ordinary automobile cooling system. These connections are, however, widely different in form and arrangement from the ordinary type. The connection 5 which for convenience will be referred to as the top connection includes a valve chamber 6 near or above the top level of the water in the jacket 1. To this chamber is connected a by-pass 7 which leads therefrom to a low point in the system shown as near the bottom of the tank 3 where it is connected to the chamber 8 of a circulating pump 9. The by-pass 7 is also connected to the reservoir by a small opening 10 near the bottom of the latter, and the pump which is driven by a shaft 14 delivers by way of a passage 11 leading to a jacket preferably discharging near the bottom of the jacket. This passage as shown is of the goose neck type, the top of the bend being near or above the top of the jacket having an opening 12 at this point by which in the present instance, as illustrated, it vents into the top passage 5 or vice versa to prevent siphoning of the water from the jacket back to the tank 3.

The bottom connection 4, in addition to including the tank 3, the pump chamber 8 and the goose neck connection 11, includes a vent 13 from the top of the reservoir 3 discharging into the atmosphere well above the water level, and a filler opening 25 which limits the water level in the reservoir or the extent to which it can be filled when the engine is idle. The connection 4, as already pointed out, leads from the bottom of the radiator to the bottom of the tank 3 which is connected at a low point therein to the pump chamber 8 which is in turn connected by the goose neck 11 to a low point in the jacket.

The connection 5 has been described as including a chamber 6 intermediate of the passage so that the passage connects the chamber to the top of the jacket and the top of the radiator from which chamber leads a bypass 7 to the bottom of the tank 3 and the intake of the pump. This latter passage is controlled by a valve 15 cooperating with a seat 16 so that the delivery of water to the pump via the passage 7 may be cut off when desired. The valve 15 is mounted on a stem 17 which also carries a valve 18 which cooperates with a valve seat 19 leading from the chamber to the passage 5 in the direction of the radiator.

This valve is actuated by a thermostatic member 20 opposed by a spring 21. The spring as illustrated bears against a stationary abutment 22 at one end, and at the other end against the valve 18, keeping it normally closed so that the water cannot enter the radiator. The thermostat 20 acts against the other side of the abutment 22, being between said abutment and a pin or shoulder 23 on the valve stem 17. When running, until the system is warmed up to the critical temperature and when the engine is idle, the radiator is empty, being drained into the reservoir 3. The thermostat which may be a flexible hollow member containing a volatile liquid, when sufficiently heated expands and acting against the compression of the spring 21, opens the valve 18 and closes the valve 15, terminating the circulation through the bypass 7 and permitting circulation through the radiator. Circulation is via the bypass 7 and tank 3 to the pump housing, from the pump through the pipe 11 to the bottom of the jacket and from the jacket by the lower half of the pipe 5 to the valve chamber, thence through the valve seat 16 and the bypass 7 to the bottom of the tank 3. It will be noted that there is a tendency at this point to mix the cooler liquid in the tank with that in circulation and vice versa, the mixing taking place through the opening 10 leading from the tank into the bypass near the bottom of the tank. In this way any vapor formed in the jacket is condensed and the heat generated is retained in the system until it reaches a point where radiation is desirable to prevent overheating.

When the temperature of maximum efficiency of the system is reached or any predetermined preferred temperature according to the setting of the thermostat, the latter acts, closing the valve 15 and opening the valve 18, transferring the path of circulation from the bypass to the radiator. In this connection it will be noted that the bottom connection of the radiator 4 leads to the bottom of the tank 3, so that any vapor not condensed in the radiator is mixed with the liquid in the tank and thus condensed, this action being particularly favorable to the use of the more volatile non-freezing mixtures. In case of excess pressure in the system there is a vent 13 leading from the tank to the open air.

Figures 1, 2:
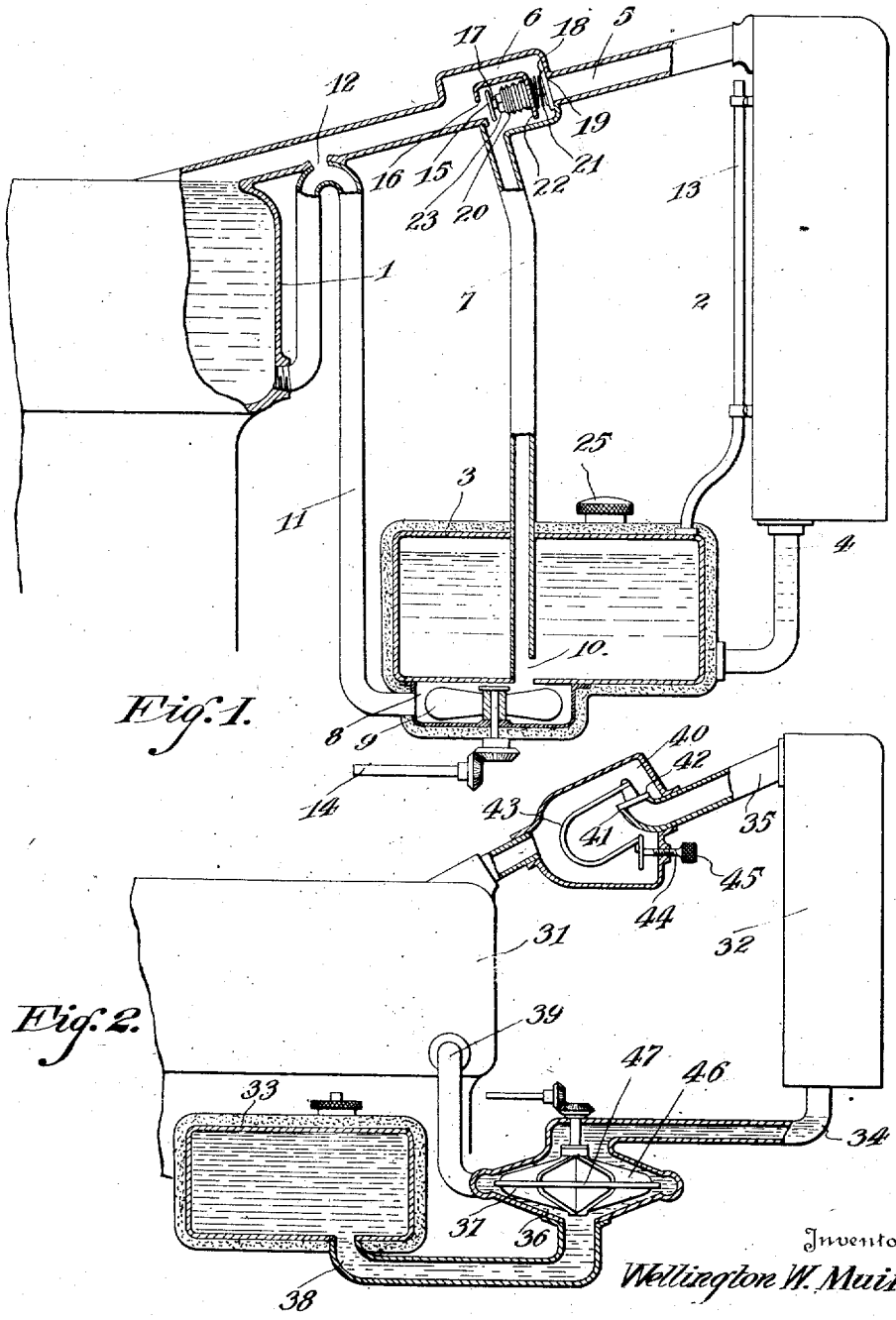
Figure 1 is an elevation partly in section showing a system which will for the purposes of description be termed the preferred form.
Figure 2 is a similar view of a system in which the member hereinafter referred to as the by-pass is eliminated.

Referring now to Figure 2. I have illustrated a system which includes a water jacket 31, a radiator 32, a tank 33 and radiator connections conveniently termed bottom connection 34 leading from the radiator and top connection 35 leading to the radiator. The bottom connection 34 includes a pump chamber 36 with a rotary centrifugal pump 37 and the pipe 39 leading from the pump delivery to the jacket. The pump has a double suction, that is, it is fed both from the radiator and from the tank 33 by supply pipe 38 leading from the bottom of the tank. The pump delivery passage 39 leads to the jacket preferably toward the bottom of the jacket.

It will be noted that the pump 37 is of peculiar construction, having blades 46 in radial planes or substantially radial planes through the axis, and a dividing plate 47 at right angles to the axis and intersecting the pump blades. This plate has the effect of dividing the suction, so that the pump is fed both from the tank and radiator or from either, delivering the cooling liquid from both or either to the jacket.

The top connection includes a valve chamber 40 having a valve seat 41 from which the upper portion of the connection 35 leads to the top of the radiator, the other portion of said connection leading from the top of the jacket to the valve chamber. This valve seat 41 is closed by means of a valve 42 actuated by a thermostat arm 43 controlled by an adjusting screw 44 which is shown as seated in a wall of the chamber having its head 45 conveniently located outside the chamber.

The tank 33 is of capacity sufficient to equal the capacity of the rest of the system and at a low point in the system relatively to the jacket and radiator, so that when the engine is not running, the cooling liquid drains into the tank which may be heat insulated to not only prevent freezing but to make starting easy, for this arrangement not only prevents excessive loss of heat from the radiator while the car is standing, but keeps the liquid well above atmospheric temperature for a long period. With this system as shown the jacket as well as the radiator is drained.

On starting the pump draws the liquid from the tank and fills the jacket, but the valve 42 is closed at temperatures below the chosen normal or critical temperature so that the radiator is inoperative until such temperature is reached. As soon as the system reaches the predetermined normal which it is desired to maintain or passes slightly above it, the valve 42 is opened by the operation of the thermostat 43 and the water is permitted to enter the radiator from which it is drawn through the bottom connection 54 to and by the pump 37 which also draws from the tank 33 so that the liquid from the radiator which may contain a quantity of vapor not condensed in the radiator is mixed with this cooler liquid to produce any desired effect of condensation.

The central division plate in the pump with the double intake from the radiator and tank forces cooling liquid to be supplied to the jacket whenever the engine is running, bringing it from wherever the supply may be located whether it is in the tank 33 or coming from the radiator 32 and it also effects the necessary mixing of the vapors if any with the cooling liquid.

In Figures 3 and 4 I have shown still another system, the system as illustrated in Figure 3 being manually controlled and that in Figure 4 being automatic and preferably adjusted to keep the system when running at the critical temperature, otherwise known as the temperature of maximum efficiency of the engine.

Referring to Figure 3, I have shown a water jacket 51, a radiator 52 placed entirely above the level of the water jacket, a tank 53 below the radiator, a bottom connection 54, top connection 55 and bypass 56.

More particularly, the top connection 55 which leads from the upper portion of the water jacket to the radiator near the top, includes a valve chamber 57 having three ports 58, 59 and 60 leading in the direction of the radiator, the by-pass and the water jacket respectively. In this valve chamber is a rotary plug valve 61 actuated by an arm 62 to which is connected a rod 63 leading to the dash or instrument board or other convenient location. The radiator or cooling member being in the present instance placed above the engine and water jacket, the top connection 55 which includes intermediately the valve chamber 57, leads from the upper part of the jacket to the radiator near the top. The radiator is drained from the bottom by a pipe 65, forming part of the bottom connection 54, which empties into the tank 53 well below the water level in the tank and as illustrated near the bottom. The tank which also forms part of the bottom connection 54 is connected by a pipe 66 to the suction of a pump 67 which in the present instance is of the rotary type like the pump 37 in the form of the invention just described, the delivery of the pump being connected by a pipe 68 to the engine jacket 51. As shown, this connection is near the bottom level of the tank, the pump being of the double suction type as already described with radiating blades and a central division plate giving a double suction, the other intake being connected to the bypass 56.

Preferably the reservoir 53 is of capacity sufficient to fill the radiator and the upper portion of the system above the reservoir without uncovering the lower end of the pipe 65 or nearly exposing the same. It has in the preferred form a vent 69 well above the water level.

In operation when the engine is idle, the radiator is normally drained, the height to which the tank can be filled being limited by the position of the filler opening 70. Assuming that the engine is started, and that the valve 61 is in the position in which the port 59 leading to the by-pass 56 and the port 60 leading to the water jacket are open, then the port 58 will be closed, for the ports and valve openings are so arranged that the ports 58 and 59 are alternately closed, and the port 60 opens when either said port 58 or 59 opens. The port 58 being closed the pump will be unable to deliver water to the radiator and will set up a continuous circulation through the jacket and through the by-pass back to said pump, a certain amount of water which is drawn from the tank will thus be mixed with the supply in the jacket. If the tank is insulated this will of course ordinarily be warm water.

As the radiator is empty when the top connection 55 is closed, there is very little loss of heat and the temperature of the water in the jacket and by-pass rises rapidly. When the desired temperature is reached, the valve 61 is moved by means of the rod 63, thus closing the by-pass and opening the top connection. Under these circumstances the pump draws almost its entire supply of water from the tank 53 and supplies it to the jacket. Said pump thus forces the liquid up through the top connection 55 to the radiator, and maintains a continuous circulation through the radiator. When it happens that excessive cooling takes place, the valve may be moved to reduce the circulation through the radiator or closed entirely to dispense with the loss of heat.

In Figure 4 I have shown a view of a cooling system like that illustrated in Figure 3 except as to the valve. In the present system a thermostatic valve like that illustrated in Figure 1 has been substituted for the manually controlled valve shown in Figure 3, the valve being indicated by reference character 75 has its various parts numbered in accordance with the disclosure of Figure 1, the other parts of this cooling system being numbered like the corresponding parts in Figure 3. The operation is exactly the same except that the thermostatic valve being set for the desired temperature, performs automatically the function of the valve 62 with its controlling means 63. In both cases the radiator being drained into the lower part of the reservoir 53, the vapors not condensed in the radiator are mixed with the liquid in the tank and thus condensed. The pump 67 is of the double suction type and serves to mix the liquid in the by-pass with the liquid from the tank, and to maintain a continuous circulation through the bypass until the critical temperature is reached and through the jacket and radiator and tank when the critical temperature is reached or passed.

Important features of the invention are found in the means for closing the passage leading to the radiator in combination with means whereby the radiator is automatically drained when the engine is stopped or delivery of water to the radiator for any reason ceases, the liquid being retained in a suitable receptacle and automatically returned to circulation when the engine is started.

In the preferred form of the invention the means for closing the connection leading to the radiator is thermostatically controlled so that this in combination with the reservoir has the effect of draining the radiator when the engine is stopped and keeping it empty until the temperature of the cooling liquid reaches the temperature of maximum efficiency. Whenever excess cooling takes place, the radiator is again cut out. Even though the engine is running, it is drained and rendered wholly inoperative until needed. This prevents loss of power by excess cooling and not only prevents freezing when the engine is idle but prevents freezing of the radiator due to the action of the thermostat which in the older systems merely stops the circulation, leaving the radiator full of liquid. In the absence of means for automatically draining the radiator, such a check to circulation permits sudden chilling and in very cold weather causes freezing of the radiator before the thermostat can act.

In addition to the automatic draining of the radiator, the invention includes in at least one form means for automatically draining both the jacket and radiator when the engine stops. This has the additional advantage of absolutely preventing injury to the engine by freezing in the jacket.

The double suction pump which draws water from the radiator, the tank and the by-pass, and delivers it to the cooling jacket affording thorough mixture and trapping of the vapors from the radiator with and in the water from the tank, giving complete condensation even where volatile cooling liquids are used is of importance in combination with the reservoir and its arrangement in relation to the radiator.

The use of a tank or reservoir of relatively large capacity containing an excess supply of liquid to receive the heated mixture of liquid and vapor from the radiator to trap the vapor and condense it, preventing loss of the volatile non-freezing elements of the cooling liquid, is of value in connection with any system, particularly those in which volatile materials are used to prevent freezing or for any other purpose.

This arrangement also has the effect of preventing loss by evaporation even where pure water is used.

I claim:—

1. In a cooling system for internal combustion engines, a circuit for cooling fluid comprising a jacket, a radiator, normally acting as a condenser, means for maintaining an excess supply of cooling liquid, and means for delivering the fluid from the radiator beneath the surface of the liquid in said supply and thereby trapping and condensing the vapor which has passed through the radiator without being condensed.

2. In a cooling system for internal combustion engines, a circuit for cooling fluid including a jacket and a radiator, normally acting as a condenser, a reservoir adapted to contain an excess supply of cooling liquid connected to the radiator and to the jacket, and means for delivering the cooling fluid from the radiator beneath the surface of said excess supply of cooling fluid, thereby trapping and retaining in the system the vaporized cooling fluid not condensed in the radiator.

3. In a cooling system for internal combustion engines, a circuit comprising a jacket and a radiator, a reservoir below the radiator connected to the circuit for receiving and containing a supply of cooling liquid, means for limiting the liquid level in said reservoir so the radiator is emptied when the delivery of liquid to it stops, means for mixing fluid from the radiator with said supply and circulating cooling liquid through the jacket and radiator, and means whereby the flow of cooling liquid to the radiator is checked until the liquid has attained a predetermined temperature and whenever there is a tendency to drop below such temperature.

4. In a cooling system for internal combustion engines, a circuit including a jacket, a radiator, a pump chamber with a pump, a bypass leading from a point in the circuit between the radiator and jacket to the pump chamber, a reservoir below the radiator connected to the radiator and to the pump chamber, means for limiting the water level in the reservoir, means for closing the bypass, means for cutting off the flow of fluid to the radiator, and means for operating said means alternately whereby the radiator is cut off, and the bypass opened when the cooling fluid is below a certain temperature and the reverse is accomplished when it exceeds a predetermined temperature.

5. In a cooling system for internal combustion engines, a jacket, a radiator normally acting as a condenser connected to the jacket; a temperature governed means for controlling said connection; a reservoir adapted to contain an excess supply of cooling liquid; a connection between the lower portion of the radiator and the lowest portion of the reservoir permitting the radiator to empty automatically into said reservoir beneath the level of liquid therein; and means for lifting the cooling fluid from the reservoir when the engine is running.

6. In a cooling system for internal combustion engines, the combination of a jacket; a radiator; means connecting said radiator to said jacket; a reservoir located at a lower level than the radiator; connections between the lowest portion of said radiator and the lowest portions of said reservoir enabling the radiator to empty automatically into said reservoir when the liquid supply to said radiator stops; additional connections between said reservoir and said jacket; and means for forcing liquid from said reservoir to said jacket through said last named connections.

7. In a cooling system for internal combustion engines, a jacket, a radiator connected to the jacket, a reservoir connected to the radiator and placed at a lower level than the radiator; and means for lifting the cooling fluid from the reservoir when the engine is running, the connection from the radiator to the reservoir extending from a low point in the radiator to a low point in the reservoir, a by-pass leading from a point in the system between the jacket and radiator to the lifting means, means for alternately closing the bypass and connection leading to the radiator, and means for limiting the water level so the radiator drains when delivery of liquid to it stops.

8. In a cooling system for internal combustion engines, a jacket, a radiator connected to the jacket, a reservoir connected to the radiator and placed at a lower level than the radiator, and means for lifting the cooling fluid from the reservoir when the engine is running, the connection from the radiator to the reservoir extending from a low point in the radiator to a low point in the reservoir, a by pass leading from a point in the system between the jacket and radiator to the lifting means, thermostatically controlled means for alternately closing the by-pass and connection leading to the radiator, and means for limiting the water level so the radiator drains when delivery of liquid to it stops.

9. In a cooling system for internal combustion engines, a circuit comprising a cooling jacket, a radiator and circulating means, a reservoir connected to the circuit below the level of the radiator and water jacket, means for lifting the water from the reservoir and passing it through the circuit so the radiator is drained when the lifting action ceases and a bypass leading from a point in the circuit between the jacket and the top of the radiator to the reservoir.

10. In a cooling system for internal combustion engines, a circuit comprising a cooling jacket, a radiator and circulating means, a reservoir connected to the circuit below the level of the radiator and water jacket and of capacity sufficient to supply and drain the system, means for lifting water from the reservoir and passing it through the circuit, a bypass leading from a point in the circuit between the jacket and the top of the radiator to the reservoir, and means for limiting the liquid content of the system so the radiator is emptied when the engine stops, and means for closing the by-pass and radiator connection alternately.

11. In a cooling system for internal combustion engines, a circuit comprising a cooling jacket, a radiator and circulating means, a reservoir connected to the circuit below the level of the radiator and water jacket, a bypass leading from a point in the circuit between the jacket, and the top of the radiator to the reservoir, and a thermally controlled valve associated with the by-pass and radiator connection to exclude the cooling fluid from the radiator until the fluid has attained a predetermined temperature, so the radiator is drained and inoperative when the engine stops, and filled and operative when the engine is at the predetermined temperature.

12. In a cooling system for internal combustion engines, a circuit comprising a jacket, a radiator normally acting as a condenser, a pump with connections to the top and bottom of the jacket, a reservoir for cooling liquid connected to the radiator to receive cooling fluid from the radiator, the connection delivering the fluid from the radiator at a low point in the reservoir to trap uncondensed vapor from the radiator.

13. In a cooling system for internal combustion engines, a circuit comprising a jacket, a radiator, circulating means, a thermostatic control between the top of the radiator and the jacket, and a reservoir in addition to the radiator and its tank for liquid receiving the fluid from the radiator.

14. In a cooling system for internal combustion engines, a circuit comprising a jacket, a radiator, a tank for cooling liquid connected to the circuit, a by-pass leading from a point in the circuit between the jacket and the top of the radiator to the reservoir, a thermostatic control serving to open and close the by-pass and the connection leading to the radiator alternately, a pump receiving from the by-pass and tank and delivering to the bottom of the jacket.

15. In a cooling system for internal combustion engines, a circuit comprising a jacket, a radiator, a top connection from the jacket to the radiator, a reservoir for cooling liquid connected to the circuit, a by-pass leading from a point in the top connection to the reservoir, a thermostatic control serving to open and close the by-pass and the top connection leading to the radiator alternately, a pump receiving from the bypass and tank having a connection by which it delivers to the bottom of the jacket, the connection having an intermediate high portion and a passage leading from said high portion to the top connection.

16. In a cooling system for internal combustion engines, a circuit comprising a jacket, a radiator, a reservoir connected to the circuit, a pump having two sets of blades on opposite sides, two inlets and one delivery, the same receiving water from the bottom of the radiator and from the reservoir and delivering it to the jacket.

17. In a cooling system for internal combustion engines, a circuit comprising a jacket, a radiator, a reservoir connected to the circuit, a pump having two inlets and one delivery, the same receiving water from the bottom of the radiator and from the reservoir and delivering it to the jacket.

18. In a cooling system for internal combustion engines, a cooling jacket, a radiator, a reservoir lower than the radiator and of capacity to drain the radiator, a rotary pump, a by-pass leading from a point in the circuit just above the jacket to the pump, the pump suction being connected to the said reservoir.

19. In a cooling system for internal combustion engines, a cooling jacket, a radiator, a reservoir below the radiator, a rotary pump having two sets of blades on opposite sides, a by-pass leading from a point in the circuit just above the jacket to the pump, a connection from the bottom of the radiator to the pump, the pump delivering to the jacket, and a valve controlling the bypass and the top radiator connection serving to open and close them alternately.

20. In a cooling system for internal combustion engines, a cooling jacket, a radiator, a connection between said radiator and jacket, a reservoir lower than the radiator into which said radiator may automatically drain when the liquid supply to said radiator stops, a pump having a divided suction connected with the reservoir, a by-pass leading from a point in the circuit just above the jacket to the pump, a connection from the bottom of the radiator to the pump, a connection between the pump and jacket, a valve controlling the by-pass and the top radiator connection serving to open and close them alternately, and a thermostatic control for said valve.

21. In a cooling system for internal combustion engines, a cooling jacket, a radiator, a reservoir lower than the radiator, a pump having a divided suction, a bypass leading from a point in the circuit just above the jacket to the pump, a connection from the bottom of the radiator to the pump through the reservoir, the pump delivering to the jacket, and a valve controlling the by-pass and the top radiator connection serving to open and close them alternately, a thermostatic control for said valve, and means for limiting the water level in the system so the radiator is drained when the engine stops or the top connection is closed.

22. In a cooling system for internal combustion engines, a jacket, a radiator, a reservoir placed at the lower level than the radiator so the radiator will empty automatically into the reservoir when the engine stops, means for lifting the cooling fluid from the reservoir to the jacket and radiator, and means for cutting off the flow of water to the radiator when the cooling is unnecessary.

23. In a cooling system for internal combustion engines, a jacket, a radiator, a reservoir placed at a lower level than the radiator so the radiator will empty automatically into the reservoir when the engine stops, means for lifting the cooling fluid from the reservoir to the jacket and radiator and thermostatically controlled means for cutting off the flow of water to the radiator.

24. In a cooling system for internal combustion engines, a jacket, a radiator, a reservoir placed at a lower level than the jacket, and radiator so the jacket and radiator will empty automatically into the reservoir when the engine stops, means for lifting cooling fluid from the reservoir to the jacket and radiator when the engine is running, thermostatically controlled means for cutting off the flow of cooling liquid to the radiator.

25. In a cooling system for internal combustion engines, comprising a jacket and a radiator with suitable connections, a thermostat controlling the admission of cooling fluid to the radiator and hence the temperature of the water in the jacket when the engine is running, and means comprising a heat insulated reservoir separated from the radiator into which said radiator may automatically drain when the liquid supply to said radiator stops.

26. In a cooling system for internal combustion engines comprising a jacket and a radiator with suitable connections, a thermostat controlling the admission of cooling fluid to the radiator and hence the temperature of the water in the jacket when the engine is running, and means for removing cooling fluid from a low point in the radiator, the system having sufficient capacity in excess of the radiator and jacket to permit the radiator to be emptied when no radiation is necessary.

27. In a cooling system for internal combustion engines, a radiator; a circuit for cooling fluid including a jacket; connections between said radiator and said circuit; means adapted to exclude said fluid from the radiator when its temperature is below a predetermined degree and to permit said fluid to enter said radiator when its temperature is above said degree; and means adapted to empty said radiator of fluid when the engine stops, substantially as described.

28. In a cooling system for internal combustion engines, a radiator; a circuit for a cooling fluid including a jacket; connections between said radiator and said circuit; means adapted to automatically exclude said fluid from the radiator when the cooling fluid is below a predetermined temperature and to permit said fluid to enter said radiator when said temperature is exceeded; and means to automatically drain said radiator when its supply of fluid ceases, substantially as described.

29. In a cooling system for internal combustion engines, a radiator; a circuit for a cooling fluid including a jacket; connections between said radiator and said circuit; means in said circuit for maintaining an excess supply of fluid; means adapted to automatically exclude said fluid from the radiator when the cooling fluid is below a predetermined temperature and to permit said fluid to enter said radiator when said temperature is exceeded: and means to automatically drain said radiator into said first named means when said radiator's supply of fluid ceases, substantially as described.

In testimony whereof, I have hereunto set my hand, at Lockport, State of New York this 15th day of March, 1922.

WELLINGTON W. MUIR.